G. E. CASSEL.
TRACTION WHEEL.
APPLICATION FILED NOV. 9, 1915.
1,229,712.
Patented June 12, 1917.
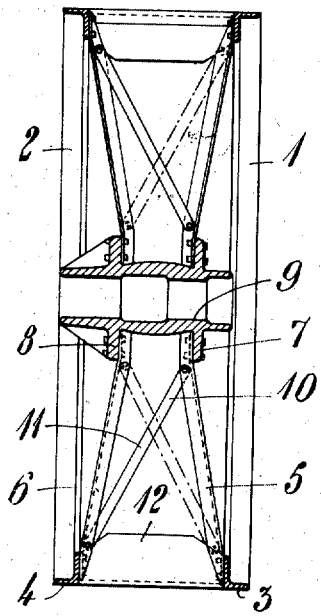
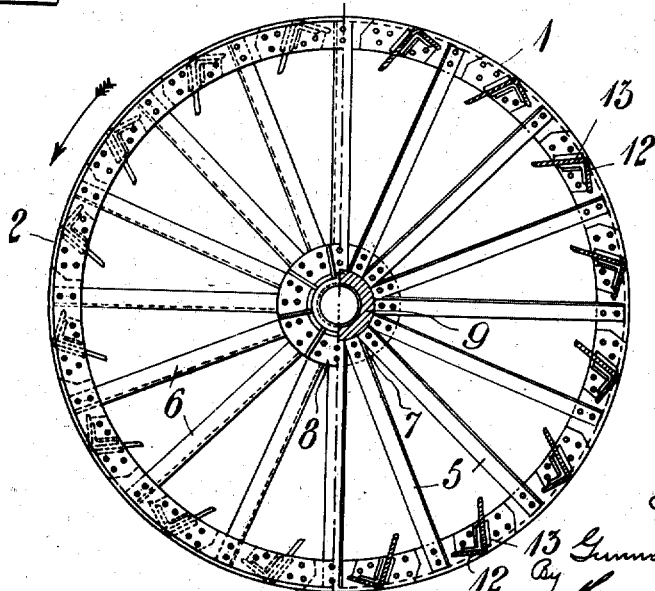

UNITED STATES PATENT OFFICE.

GUNNAR ELIAS CASSEL, OF STOCKHOLM, SWEDEN, ASSIGNOR TO ARTUR LEFFLER, OF DJURSHOLM, SWEDEN.

TRACTION-WHEEL.

1,229,712.                Specification of Letters Patent.    Patented June 12, 1917.

Application filed November 9, 1915. Serial No. 60,527.

*To all whom it may concern:*

Be it known that I, GUNNAR ELIAS CASSEL, a citizen of the Kingdom of Sweden, residing at Stockholm, Sweden, have invented new and useful Improvements in Traction-Wheels, of which the following is a specification.

The traction wheels for traction engines, gun automobiles and similar heavy vehicles are, as is well-known, to be so constructed, that they, on the one hand, are capable of finding a hold in loose, cultivated ground without slipping, while, on the other hand, they are to be prevented from damaging the road surface, when the vehicle is conveyed on usual roads. To attain the first named purpose the traction wheels have hitherto been provided with ribs, shoes or other projections extending outside the periphery of the wheel and adapted to engage the loose ground and thereby to prevent the wheels from slipping. In order that the said projections should not be damaged or injure the roads or other firm ground, they have either to be made detachable or of so small size, that they are unable to prevent slipping, and in both cases the arrangement is complicated and unreliable.

This invention relates to a traction wheel for traction engines, gun automobiles and the like, and its object is the provision of a traction wheel by means of which such vehicles can be drawn on cultivated ground without the risk of slipping, while, on the other hand, the traction wheels do not injure the road surface, when the vehicle is running on usual road. Said purposes are attained without the use of any movable members extending outside the periphery of the wheel or secured to the same.

With the said object in view the rim of the traction wheel consists of two or more rings of structural iron, preferably angle-iron, separated from each other. Secured between said rings around the periphery is a series of spade-shaped members preferably made of angle-iron and adapted, when the wheel passes loose ground and the lateral rings go down therein, to engage the surface of the ground and to find a hold in the same, thus preventing the wheel from slipping. The said lateral rings constitute a supporting frame of sufficient size for the running on firm ground, since their peripheral surfaces situated at equal distance from the shaft of the wheel are formed by a plane surface of the structural iron, while the spade-shaped members are situated within the outer periphery of the wheel and, owing thereto, are inoperative, when running on firm ground, whereas said members, when the wheel goes down into the loose ground, engage effectively the surface of the ground. The spade-shaped members preferably made of angle-iron may for the said purpose be so placed, that the angle-sides form oblique angles with the radius of the wheel.

A preferred embodiment of the invention is illustrated in the accompanying drawing in which—

Figure 1 is a longitudinal section through a traction wheel constructed in accordance with the invention. The left part of Fig. 2 is a side-view of the wheel, while the right part of the same figure is a section through the wheel taken at right angles to the shaft.

Referring to Fig. 1, 1 and 2 denote two rings concentric to the shaft of the wheel and separated from each other. Said rings constitute the rim of the wheel, and each of them presents a surface 3 and 4 respectively concentric to the said shaft and of such a width, that the wheel by means of said surfaces can pass roads without damaging them. As is evident from Fig. 1, the rings are for that purpose made of angle-iron, one angle-side of each angle-iron being placed in the manner described. Each of the rings 1 and 2 is by means of spokes 5 and 6 respectively formed of angle iron connected with flanges 7 and 8 respectively extending from the wheel-hub 9, and, besides, the spokes 5 and 6 are interconnected by cross-ties 10 and 11. Secured between the rings 1 and 2 around the periphery of the wheel is a series of spade-shaped members 12, each of which has a surface 13 extending in the longitudinal direction of the shaft and so placed that, when the wheel rolling in the direction indicated by the arrow in Fig. 2 goes down to a certain extent into loose ground, the surfaces 13 penetrate in oblique direction therein. Owing thereto the surfaces 13 will flatten down successively the loose soil and, in the driving position at the lower part of the wheel, obtain a firm hold in the ground, so that slipping of the wheel is avoided.

The members 12 may be of any suitable shape, provided they have a surface 13 arranged in the manner described. To give the members 12 the necessary strength they may, as is shown in the drawing, be made of angle-iron.

In order to attain the said effect of the surfaces 13, the members 12 need not extend outside the periphery of the wheel or in other words outside the rings 1 and 2. On account thereof it is possible with wheels of the kind described to pass carriage-ways without the risk of the ways being damaged by members extending outside the wheel-rim, and, besides, the wheel is capable of drawing the vehicle in question on loose, cultivated ground without slipping. Owing to the fact that the rim of the wheel constitutes an open framework, the spaces between the spade-formed members will not be filled with earth, as is the case in traction wheels having projecting ribs which easily causes slipping.

Obviously, the constructional form of the invention illustrated in the drawing may be modified in various manners without deviating from the principles of the invention. Thus for instance, the wheel-rim may comprise more than two annular members together with members 12 interposed between them.

Having now described my invention, what I claim as new and desire to secure by Letters Patent is:

A traction wheel, forming a framework open on all sides and comprising two side rings of angle metal, one flange of each ring forming a plane running surface at the periphery of the wheel, members of angle metal rigidly connecting said rings at intervals within the periphery of the wheel, the operative surface of each of said members forming oblique angles with the radius of the wheel, and spokes of angle metal connected with the side rings between said connecting members, substantially as and for the purpose set forth.

In testimony whereof I have signed my name in presence of two subscribing witnesses.

GUNNAR ELIAS CASSEL.

Witnesses:
JOHN OCLENA,
K. E. WIBERG.